United States Patent [19]

Nielson et al.

[11] Patent Number: 5,321,783
[45] Date of Patent: Jun. 14, 1994

[54] MOUNT FOR OPTICAL FIBERS

[75] Inventors: Roger M. Nielson; Benjamin F. Van Pelt; Michael B. Checketts, all of Colorado Springs, Colo.

[73] Assignee: Spectranetics Corporation, Colorado Springs, Colo.

[21] Appl. No.: 899,470

[22] Filed: Jun. 16, 1992

[51] Int. Cl.⁵ ............................................... G02B 6/26
[52] U.S. Cl. ........................................ 385/76; 385/77; 385/80
[58] Field of Search ................ 385/76, 77, 80, 54, 385/53

[56] References Cited

U.S. PATENT DOCUMENTS

| | | | |
|---|---|---|---|
| 4,589,404 | 5/1986 | Barath et al. | 128/6 |
| 4,648,892 | 3/1987 | Kittrell et al. | 65/4.21 |
| 4,892,381 | 1/1990 | Glasheen | 350/96.22 |
| 4,919,508 | 4/1990 | Grace et al. | 350/96.20 |
| 4,925,266 | 5/1990 | Huebscher et al. | 350/96.20 |
| 4,994,134 | 2/1991 | Knecht et al. | 156/294 |
| 5,007,704 | 4/1991 | McCartney | 350/96.21 |
| 5,039,492 | 8/1991 | Saaski et al. | 422/82.09 |
| 5,134,673 | 7/1992 | Stephenson et al. | 385/54 |

Primary Examiner—Rodney B. Bovernick
Assistant Examiner—Stephen W. Barns
Attorney, Agent, or Firm—Cushman, Darby & Cushman

[57] ABSTRACT

A mount for connecting a light source to optical fibers in a fiber optic catheter or the like is disclosed. The optical fibers are bonded to a mount body which mates with a light source. The mount body has a notch on its end, and the ends of the optical fibers project over this notch so that the substrate is not damaged by the light source. The fibers may project over the notch freely, or an insert may be provided in the notch for added stability.

53 Claims, 3 Drawing Sheets

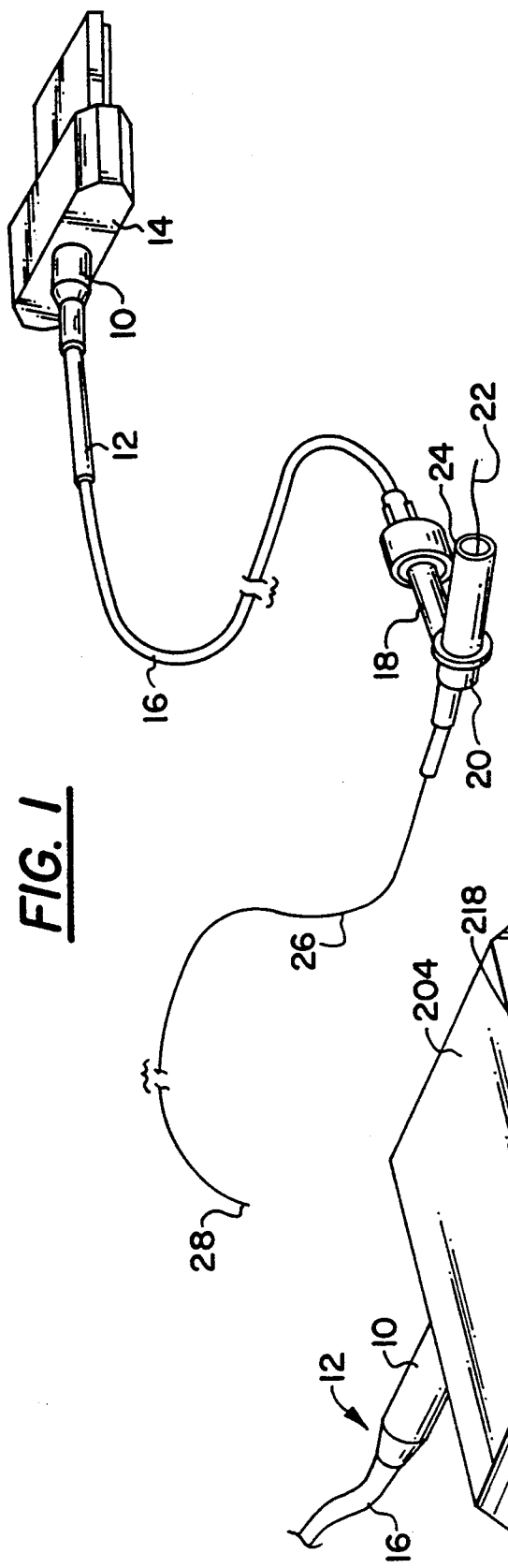
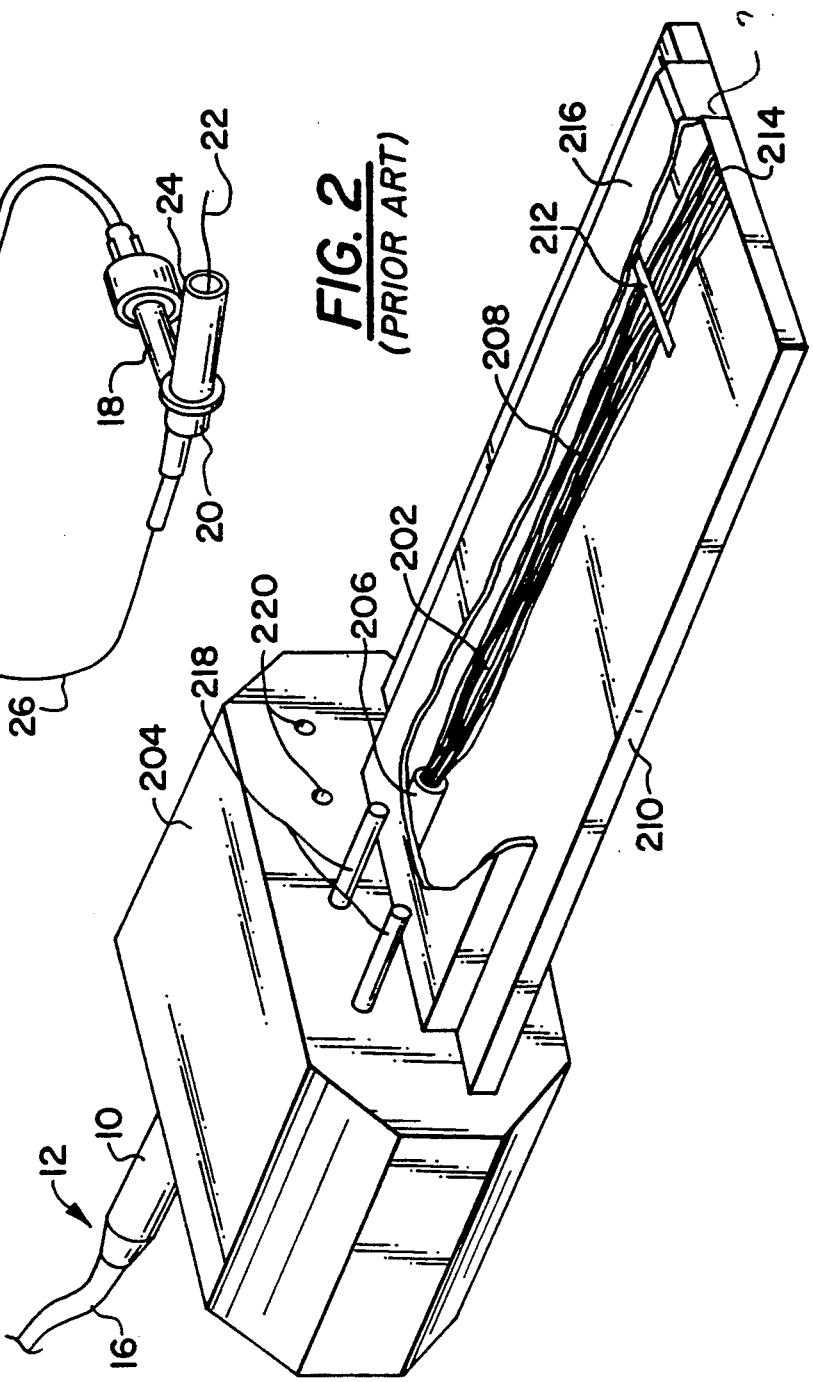
FIG. 1
FIG. 2 (PRIOR ART)

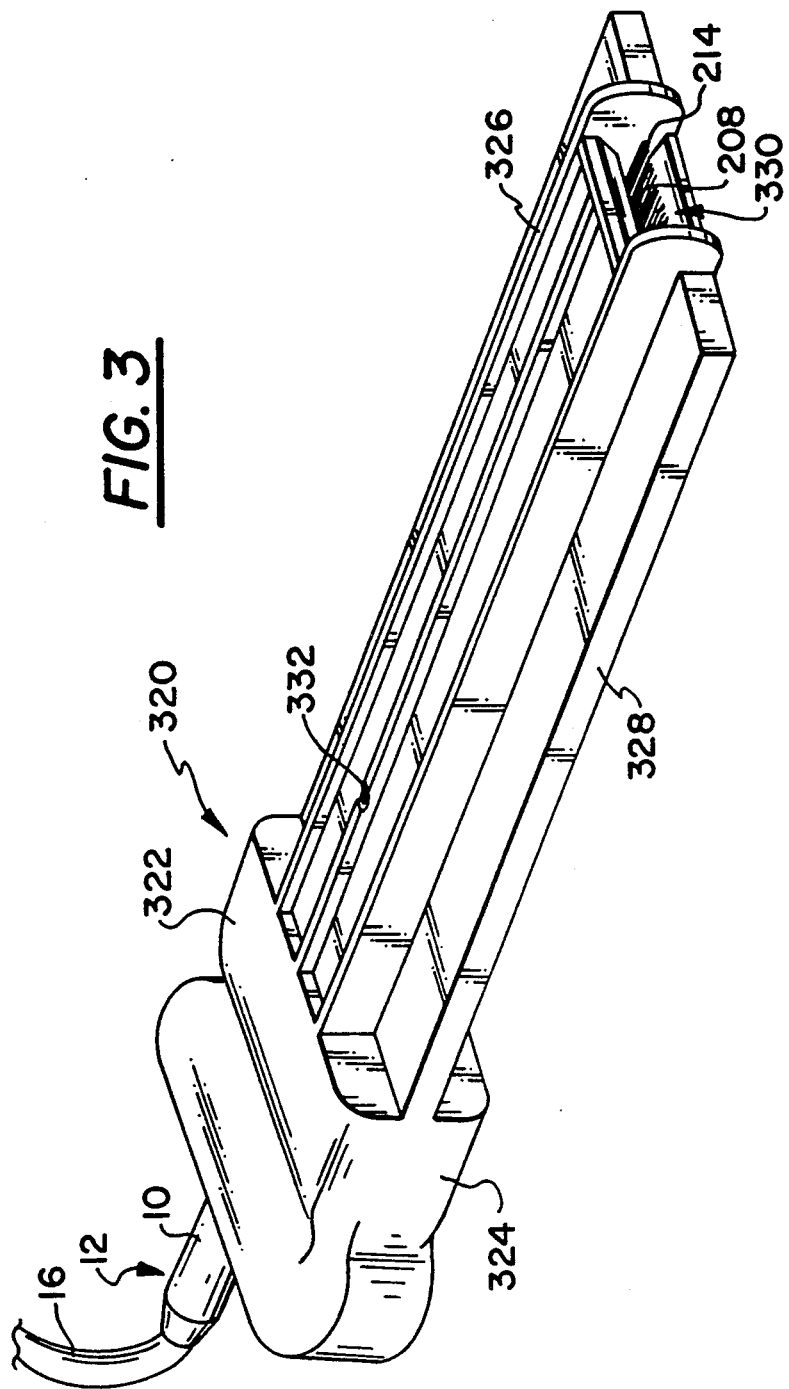

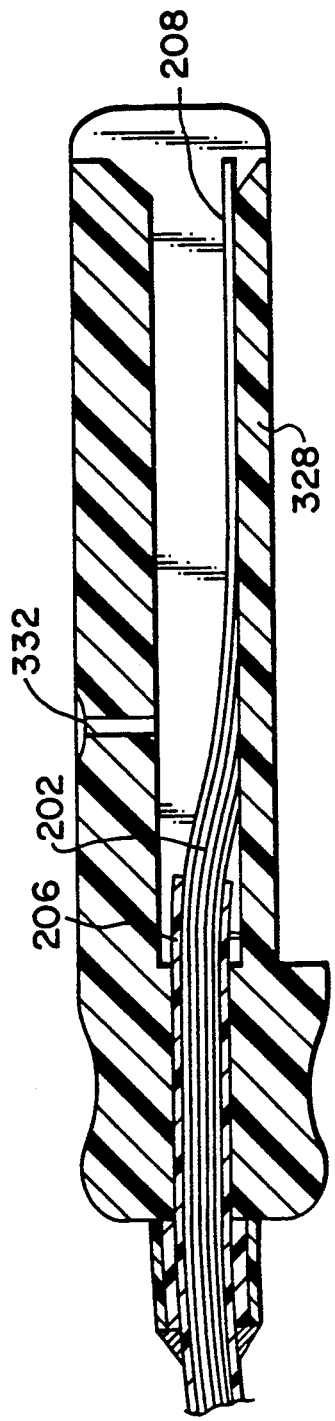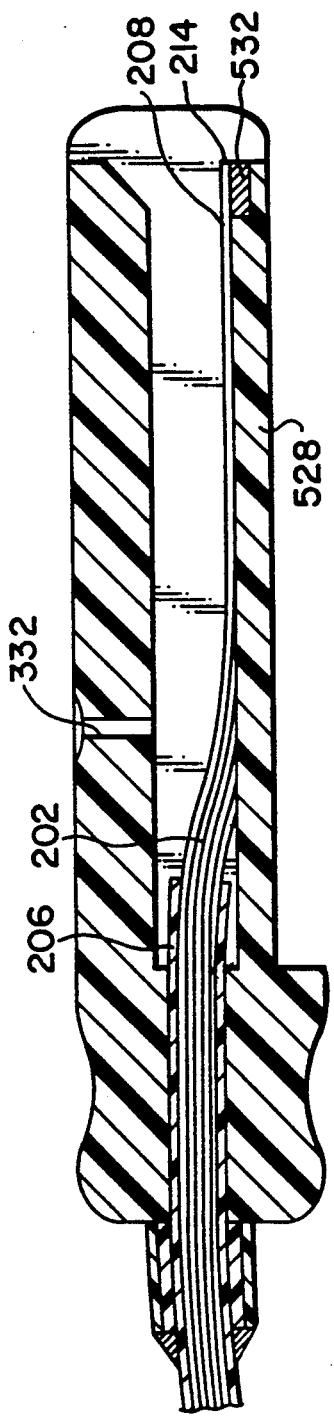

MOUNT FOR OPTICAL FIBERS

BACKGROUND OF THE INVENTION

1. Field of the Invention

The present invention relates to mounts for terminating optical fibers. More specifically, the present invention relates to mounts for terminating fiber optic catheters used for irradiating and ablating intravascular regions during surgical operations.

2. Description of the Related Art

Fiber optic catheters are hollow tubular devices containing optical fibers. Such catheters are inserted into veins or arteries to illuminate internal parts of the body for diagnostic and surgical purposes. Many medical applications require delivery of light energy, such as laser energy, through an optical fiber or similar waveguide device disposed in a body cavity for treatment or diagnosis. These include the ablation of tissue such as plaque and tumors, the destruction of calculi and the heating of bleeding vessels for coagulation. The lasers used may produce either pulsed or continuous-wave light of wavelengths ranging from the ultra-violet to the infra-red. In these applications, some way to couple the laser to the optical fibers of the catheter is required.

FIG. 1 depicts a perspective view of a fiber optic catheter employing a mount according to the present invention. As used herein, "proximal" refers to closer to the source of energy and "distal" refers to further from the source of energy. Thus, the distal end of the catheter is the end of the catheter which is to be inserted into a body cavity or lumen and the proximal end of the catheter is the end which remains outside the body. Similarly, the end of the fiber optic connector which receives the fiberoptic cable will be referred to as its distal end, and the opposite end of the connector, where the fibers are terminated, will be referred to as its proximal end. The fiberoptic connector described herein below will be referred to as a proximal mount because it is mounted to the proximal end of the cable. A proximal end 12 of light conveying cable 16 is connected to proximal mount 14. Strain relief 10 is disposed around light conveying cable 16 to protect the catheter from damages due to stresses along the assembly. Light conveying cable 16 has optical fibers disposed within, and these fibers are affixed to proximal mount 14 using techniques more fully described herein.

A second end of light conveying cable 16 is attached to a side branch 18 of bifurcating adaptor 20, and guide wire 22 is fed into an inline branch 24 of bifurcating adaptor 20. The other end of bifurcating adaptor 20 is attached to catheter 26, which has an outer body, an inner body disposed within the outer body to form an outer lumen therebetween and an inner lumen within said inner body, optical fibers disposed within the [space between the] outer lumen, and guide wire 22 running through the center of the catheter. The inner body and the outer body may be constructed from any of a number of suitable materials, such as plasticized vinyl resins, polyethylene, synthetic and natural rubbers and polyurethane elastomers. The distal end of catheter 26 is terminated by tip 28. Proximal mount 14 will now be described in detail.

FIG. 2 is an enlarged perspective view of a proximal mount for a fiber optic catheter according to the prior art. The proximal end 12 of light conveying cable 16 containing optical fibers 202 passes through strain relief 10 and into a distal side of mount body 204. Strain relief 10 may be of a coil or elastomer type material as is known in the art, and the mount body 204 may be made of any suitable material, such as aluminum or plastic, e.g., Delrin, PVC, polycarbonate, etc.

The light conveying cable 16 passes through mount body 204 and emerges from its proximal side. The optical fibers 202 extend past the terminal end of the light conveying cable casing 206 and spread out in a ribbon-like fashion to form a linear array of optical fibers 208. This array is bonded to a quartz slide 210 which has a distal end fixed to mount body 204. Bonding of fiber array 208 to quartz slide 210 may be done with any conventional adhesive, e.g., epoxy, cyanoacrylate, etc. Structural integrity may be increased by providing a bonding element 212 to bond on top of the fiber array 208 so that it is "sandwiched" between quartz slide 210 and element 212.

The terminal ends of the optical fibers 214 are substantially coterminal with the proximal end of quartz slide 210. The proximal end of the assembly is polished to provide a smooth optical surface. Cover 216 is attached to quartz slide 210 which covers the optical fiber assembly to protect it from damage. A portion of cover 216 has been "cut away" in FIG. 2 to more clearly show the structure of the mount; however, the cover actually extends over the entire fiber assembly and is substantially symmetric about a vertical plane passing through the center of the mount.

Mount body 204 may be provided with pins 218 and holes 220 to actuate switches associated with the light source to provide information to the laser concerning the nature of the catheter, such as its size and the power level to be delivered by the laser to the catheter. One such system is disclosed in U.S Pat. No. 4,919,508 to Grace et al., incorporated herein by reference.

In use, the proximal mount is mated with an appropriate receptacle of a light source such as a laser. The light energy from the source is directed onto the terminal ends 214 of fiber array 208. This energy is conveyed by the fibers through light conveying cable 16 to the distal tip of the catheter where it emerges, thus providing energy for ablation of intravascular regions and other operations as described above.

A quartz slide is used in the prior art design for several reasons. First, it was found that intense light energy (for instance, from a laser) hitting slides made from other materials tended to degrade the material quickly. This degradation generally left deposits of debris on the terminal ends of the fibers, thus decreasing the light transmitting capabilities of the catheter. Also, in the prior art design, the fibers are bonded directly to the slide and the bonding glue near the proximal end is burned off with a $CO_2$ laser. A quartz slide is not damaged by this process as are some other types of slides. Finally, the operating environment of the proximal mount subjects the slide to a range of temperatures. The low coefficient of thermal expansion of the quartz slide reduces alignment problems as compared to other materials which may have greater coefficients of thermal expansion.

SUMMARY OF THE INVENTION

Although the above-described proximal mount design provides excellent results, the present inventors have discovered that several advantages could be realized if the amount of quartz utilized could be reduced or eliminated completely. The quartz slide is relatively expensive and labor-intensive to manufacture. If it is polished improperly, it must be discarded. Once the slide is polished, mounting the fibers on the slide is labor intensive and requires the use of sophisticated production/fixturing equipment.

It is an object of this invention to provide a mount for optical fibers such as a proximal mount in a fiber optic catheter that can be fabricated less expensively than prior art mounts.

It is a further object of this invention to provide a mount that reduces or eliminates the use of expensive and difficult to machine substances such as quartz.

It is a still further object of this invention to provide a method of fabricating a mount that is easier and more reliable than previously known methods.

The above objects are achieved by providing a mount for connecting a light source to optical fibers where the mount has a mount bonding with a recess or notch at its proximal end. The optical fibers are bonded to the mount body so that the ends of the optical fibers project over the notch and the substrate material is not damaged by the light source. The fibers may project over the notch freely, or an insert of another material may be provided in the notch for added stability.

BRIEF DESCRIPTION OF THE DRAWINGS

These and other objects and advantages of this invention will become apparent and more readily appreciated from the following description of the presently preferred exemplary embodiments, taken in conjunction with the accompanying drawings, of which:

FIG. 1 is a perspective view of a fiber optic catheter and associated mount according to the present invention;

FIG. 2 is an enlarged perspective view of a proximal mount according to the prior art with a cut-away section to show the interior of the proximal mount;

FIG. 3 is an enlarged perspective view of a first embodiment of the present invention;

FIG. 4 is a cross-sectional view of a first embodiment of a mount according to the present invention; and FIG. 5 is a cross-sectional view of a second embodiment of a mount according to the present invention.

DETAILED DESCRIPTION OF THE PRESENTLY PREFERRED EXEMPLARY EMBODIMENTS

FIGS. 3 and 4 illustrate a first embodiment of the present invention. Referring first to FIG. 3, the proximal end 12 of light conveying cable 16 containing optical fibers passes through strain relief 10 and into a distal side of mount body 320. Mount body 320 comprises upper partial housing 322 and lower partial housing 324. The two partial housings may be joined together by using snap tabs projecting from one partial housing and mating with corresponding holes in the other partial housing or by using a conventional adhesive to bond the partial housings together. Alternatively, they may be bonded together using ultrasound welding techniques, as is more fully described below.

As in the prior art, strain relief 10 may be of a coil or elastomer type material, and mount body 320 may be made of any suitable material, such as aluminum or plastic.

Light conveying cable 16 passes through mount body 320 and emerges from its proximal side. The optical fibers extend past the terminal end of the light conveying cable casing and spread out in a ribbon-like fashion to form a linear array of optical fibers 208. This array is bonded to projection 328 of partial housing 324. Preferably (but not necessarily), projection 328 is formed integrally with the remainder of lower partial housing 324. Bonding of fiber array 208 to projection 328 may be done by wicking a conventional adhesive (e.g., epoxy, cyanoacrylate or ultraviolet-activated adhesive) through a hole 332 disposed in cover 326 of upper partial housing 322. Preferably, cover 326 is formed integrally with the remainder of partial housing 322.

FIG. 4 shows how optical fibers 202 extend past the terminal end of light conveying cable casing 206 and spread out in a ribbon-like fashion to form a linear array of optical fibers 208. FIG. 4 also shows hole 332 disposed in projection 328 for wicking adhesive along optical fibers 202.

Referring to FIG. 3, projection 328 is provided with notch 330 at its proximal end, and the terminal ends 214 of the linear array of optical fibers 208 project over this notch and are substantially coterminal with the proximal end of projection 328. It has been found that a notch having a triangular cross-section that starts at approximately 0.050" to 0.100" back from the proximal end of projection 328 prevents beam damage to the projection material while providing adequate support for fiber array 208. Plastic and aluminum have been found suitable for use as projection 328 and cover 326. In this way, the requirement that the terminal ends of optical fibers 214 be bonded to a quartz substrate is eliminated.

A method of fabricating a mount according to the present invention will now be described with particular reference to FIG. 3. First, strain relief 10 is slid over light conveying cable 16. Then, the buffer coating surrounding optical fibers 202 is stripped away. Optical fibers 202 are aligned in a linear array 208 with the aid of a substantially flat form or fixture and adhesive is applied to the fibers. The glue hardens, thereby fixing the ends of the fibers in the shape of linear array 208. The ribbon thus formed is peeled off the form and is clamped between two polishing slides. The terminal ends of the fibers 214 projecting from the edges of the polishing slides are then polished using techniques known in the art. Once the ends of the fibers have been polished, the glue on the terminal ends of optical fibers 214 are burned off using a suitable energy source. The rigid, polished ribbon assembly is then positioned on one of the partial housings 322 and 324 and the two partial housings are joined together. Alternatively, the fibers may be bonded to projection 328 before the burning and polishing steps.

As described above, the partial housings may be bonded together using snap tabs, adhesives, or ultrasound welding. The area accommodating linear array 208 is slightly oversized so that the exact position of the array 208 may be adjusted precisely at the time of manufacture. Once array 208 is in its proper position, it is fixed in place by wicking adhesive through a hole in projection 328 and along optical fibers 202. As described above, the wicking process may be controlled by using epoxy, cyanoacrylate or ultraviolet-activated adhesive.

Elimination of the quartz slide provides other advantages in addition to cost reduction. Since the fibers need not be bonded to the quartz, they can more easily be manipulated before installation in mount body 320. For instance, adhesive may more easily be burned off the terminal ends of the fibers 214. Also, the terminal ends of the fibers 214 may be more easily polished and reworked if necessary.

Mount body 320 may be provided with pins and holes for establishing contact between the catheter and the light source. These features, however, are not essential to the present invention and are not illustrated for the sake of simplicity.

FIG. 5 is a cross-sectional view of a second embodiment of a mount according to the present invention. Many of the features of this embodiment are similar to those of the first embodiment; however, in this embodiment, the terminal ends of the optical fibers 214 do not project into free space as in the first embodiment. Instead, an insert 532 is disposed in a notch in projection 528 and the terminal ends 214 of optical fibers 208 are bonded thereto. In contrast to the prism-shaped notch in the first embodiment, the notch in this embodiment has a rectangular cross-section to accommodate a parallelepiped insert. An insert 532 having dimensions of approximately 0.05"×0.25"×0.5" has been found to provide acceptable results. Insert 532 may be made of any material with proven suitability to the exposure to laser radiation for the appropriate application. Examples include aluminum, quartz, and ceramics.

Fabrication of the second embodiment of this invention is similar to that of the first embodiment; however, the insert 532 must be placed in its notch before the optical fibers 208 are bonded to projection 528, since the terminal ends 214 of optical fibers 208 must be bonded to the insert 532. Insert 532 may be bonded to projection 528 using a suitable adhesive.

This embodiment provides many of the advantages of the first embodiment as well as providing additional stability and structural integrity for the proximal end of the mount. Typically, a quartz piece for the mount may be reduced from approximately 4 cm³ to 0.1 cm³, or if another insert material is selected, may be completely eliminated.

Although a few preferred embodiments of the invention have been shown and described, it will be appreciated by those skilled in the art that changes may be made in these embodiments without departing from the principles and the spirit of the invention, the scope of which is defined in the appended claims. Particularly, the present invention is not limited to fiber optic catheters but may be used in any application where termination of optical fibers is required.

What is claimed is:

1. A mount for a fiber optic cable, said mount comprising:
   a projection having optical fibers bonded to a mounting surface of said projection at a proximal end thereof,
   wherein said projection has a notch defined on a proximal edge of said mounting surface, said notch having a distal end edge and a proximal edge, said distal end edge of said notch being in a plane of said mounting surface; and
   said terminal ends of said optical fibers project proximally past said distal end edge of said notch.

2. The mount of claim 1, wherein said projection is one of plastic or aluminum.

3. The mount of claim 1, wherein said notch has a triangular cross-section.

4. The mount of claim 1, wherein said distal edge of said notch is approximately between 0.05" and 0.1" from said proximal edge of said projection mounting surface.

5. The mount of claim 1, said mount further comprising:
   a housing, said optical fibers passing through said housing from a distal side to a proximal side thereof,
   wherein a distal end of said projection is disposed at said proximal side of said housing.

6. The mount of claim 5, further comprising a strain relief disposed about said optical fibers at said distal side of said housing.

7. The mount of claim 5, said housing comprising an upper partial housing and a lower partial housing, said partial housings being bonded together.

8. The mount of claim 7, wherein said projection integral with one of said partial housings.

9. The mount of claim 7, further comprising a cover disposed proximate to said optical fibers opposite said projection, so that said optical fibers are exposed on only a proximal end thereof.

10. The mount of claim 9, wherein said cover is integral with one of said partial housings.

11. The mount of claim 7, wherein said upper housing and said lower housing are bonded together using snap tabs.

12. The mount of claim 7, wherein said upper housing and said lower housing are bonded together by an adhesive.

13. The mount of claim 7, wherein said upper housing and said lower housing are bonded together by ultrasound welding.

14. The mount of claim 1, further comprising a cover disposed proximate to said optical fibers and opposite said projection, so that said optical fibers are exposed on only a proximal end thereof.

15. The mount of claim 1, wherein said fibers are bonded to said mounting surface using an adhesive.

16. The mount of claim 15, wherein said adhesive is at least one of epoxy or cyanoacrylate.

17. The mount of claim 15, wherein said adhesive is an ultraviolet-activated adhesive.

18. The mount of claim 1, wherein said optical fibers are bonded to said mounting surface in a linear array.

19. A mount for a fiber optic cable, said mount comprising:
   a projection having optical fibers bonded to a mounting surface of said projection at a proximal end thereof;
   a notch disposed on a proximal edge of said mounting surface; and
   an insert disposed in said notch, said insert having a surface substantially coplanar with said mounting surface,
   wherein the terminal ends of said optical fibers are adjacent to said coplanar insert surface.

20. The mount of claim 19, wherein said projection one of plastic or aluminum.

21. The mount of claim 19, wherein said insert is one of quartz or aluminum.

22. The mount of claim 19, wherein said notch has a rectangular cross-section.

23. The mount of claim 19, wherein said distal edge of said notch is approximately 0.25" from said proximal edge of said projection mounting surface.

24. The mount of claim 19, said mount further comprising:
   a housing, said optical fibers passing through said housing from a distal side to a proximal side thereof, wherein a distal end of said projection is disposed at said proximal side of said housing.

25. The mount of claim 24, further comprising a strain relief disposed about said optical fibers at said distal side of said housing.

26. The mount of claim 24, said housing comprising an upper partial housing and a lower partial housing, said partial housings being bonded together.

27. The mount of claim 26, wherein said projection is integral with one of said partial housings.

28. The mount of claim 26, further comprising a cover disposed proximate to said optical fibers opposite said projection, so that said optical fibers are exposed on only a proximal end thereof.

29. The mount of claim 28, wherein said cover is integral with one of said partial housings.

30. The mount of claim 26, wherein said upper housing and said lower housing are bonded together using snap tabs.

31. The mount of claim 26, wherein said upper housing and said lower housing are bonded together by an adhesive.

32. The mount of claim 26, wherein said upper housing and said lower housing are bonded together by ultrasound welding.

33. The mount of claim 19, further comprising a cover disposed proximate to said optical fibers and opposite said projection, so that said optical fibers are exposed on only a proximal end thereof.

34. The mount of claim 19, wherein said fibers are bonded to said mounting surface using an adhesive.

35. The mount of claim 34, wherein said adhesive is at least one of epoxy or cyanoacrylate.

36. The mount of claim 34, wherein said adhesive is an ultraviolet-activated adhesive.

37. The mount of claim 19, wherein said optical fibers are bonded to said mounting surface in a linear array.

38. The mount of claim 19, wherein said optical fibers are bonded to said coplanar insert surface.

39. A method of fabricating a mount for optical fibers, said method comprising the steps of:
providing a mount body having a notch defined on a proximal edge thereof, said notch having a distal end edge and a proximal edge, said distal end edge of said notch being in a plane of a mounting surface of said mount body;
forming a plurality of optical fibers into an array of fibers suitable for mounting on said mounting surface of said mount body;
disposing the terminal ends of said array of fibers proximal to said notch so that said terminal ends of said fibers are free from contact with said mount body; and
bonding said array of fibers to said mounting surface of said mount body.

40. The method of claim 39, said forming step comprising the step of:
removing a buffer coating from said optical fibers.

41. The method of claim 39, said disposing step comprising the step of:
disposing said terminal ends of said array fibers to extend freely in said notch.

42. The method of claim 39, said bonding step comprising the steps of:
positioning said array of fibers on said mount body at an optimal location;
wicking adhesive along said optical fibers to fix said array in position on said mount body.

43. The method of claim 39 wherein said mount body comprises an upper partial mount housing and a lower partial mount housing, said bonding step comprising a step of bonding said array of fibers on one of said partial mount housings, said method further comprising a step of:
joining said partial mount housings together.

44. The method of claim 43, said joining step comprising a step of:
joining said partial mount housings together using an adhesive.

45. The method of claim 44, joining step comprising a step of:
joining said partial mount housings together using snap tabs.

46. The method of claim 43, said joining step comprising a step of:
joining said partial mount housings together using ultrasound welding.

47. The method of claim 39, said method further comprising the step of:
placing a strain relief over a cable containing a portion of said optical fibers.

48. The method of claim 39, said method further comprising the step of:
polishing the terminal ends of said optical fibers.

49. A method of fabricating a mount for optical fibers, said method comprising the steps of:
forming a plurality of optical fibers into any array of fibers suitable for mounting on a mount body;
disposing the terminal ends of said array of fibers proximate to a notch in said mount body so said terminal ends of said fibers do not contact said mount body; and
bonding said array of fibers on said mount body, said forming step comprising the steps of:
placing said optical fibers in a form;
bonding said optical fibers together using glue;
curing said glue to form a rigid fiber array; and
removing said rigid fiber array from said form.

50. The method of claim 49, further comprising the step of:
removing said glue from the terminal ends of said fibers.

51. The method of claim 50, said removing step comprising the step of:
illuminating said terminal ends of said fibers with laser light.

52. A method of fabricating a mount for optical fibers, said method comprising the steps of:
forming a plurality of optical fibers into an array of fibers suitable for mounting on a mount body;
disposing the terminal ends of said array of fibers proximate to a notch in said mount body so said terminal ends of said fibers do not contact said mount body; and
bonding said array of fibers on said mount body, said bonding step comprising the steps of: positioning said array of fibers on said mount body at an optimal location; wicking adhesive along said optical fibers to fix said array in position on said mount body; and further comprising:
placing an insert in said notch.

53. The method of claim 52, further comprising a step of:
bonding said terminal ends of said fibers to said insert.

* * * * *